(12) United States Patent
Rouzeaud et al.

(10) Patent No.: US 7,453,398 B2
(45) Date of Patent: Nov. 18, 2008

(54) PROCESS COMPENSATING FOR ARRAY ANTENNA RADIATING ELEMENT POSITIONING ERRORS

(75) Inventors: Benjamin Rouzeaud, Friaucourt (FR); Claude Chekroun, Gif sur Yvette (FR); Marc-Yves Lienhart, Paris (FR)

(73) Assignee: Thales (FR)

( * ) Notice: Subject to any disclaimer, the term of this patent is extended or adjusted under 35 U.S.C. 154(b) by 0 days.

(21) Appl. No.: 11/687,638

(22) Filed: Mar. 17, 2007

(65) Prior Publication Data

US 2008/0030412 A1    Feb. 7, 2008

(30) Foreign Application Priority Data

Mar. 17, 2006    (FR)    ................................. 06 02381

(51) Int. Cl.
*H01Q 3/00* (2006.01)
*G01S 5/02* (2006.01)
(52) U.S. Cl. ..................... 342/368; 342/196; 342/420
(58) Field of Classification Search ............. 342/174, 342/196, 368, 420, 442, 451
See application file for complete search history.

(56) References Cited

U.S. PATENT DOCUMENTS

| 5,412,390 | A  | * | 5/1995 | Peavey et al. | ............. | 342/417 |
| 7,307,595 | B2 | * | 12/2007 | Schantz et al. | ............. | 343/718 |
| 2007/0152871 | A1 | * | 7/2007 | Puglia | ............. | 342/70 |

FOREIGN PATENT DOCUMENTS

WO    93/11581 A    6/1993

OTHER PUBLICATIONS

Zaghloul Amir I et al.; "On The Removal Of Blindness In Phased Antenna By Element Positioning Errors"; IEEE Transactions on Antennas and Propagation, IEEE Service Center, Piscataway, NJ, US, vol. AP-20, 1972, pp. 637-641, XP008072326; ISSN: 0018-926X.

Zaghloul A I et al.; "Generalized Cross-Correlation Analysis Of Phased Array Admittance"; Radio Science, American Geophysical Union, Washington, DC,, US, vol. 11, No. 1, janvier 1976 (Jan. 1976), pp. 61-70, XP008072327, ISSN: 0048-6604.

* cited by examiner

*Primary Examiner*—Dao L Phan
(74) *Attorney, Agent, or Firm*—Lowe Hauptman Ham & Berner, LLP (57) ABSTRACT

The invention refers to array antennas consisting of a set of individual sources set out over the surface of the antenna and whose mechanical positioning is determined in such a way as to obtain the desired radiation pattern. The process according to the invention is designed to compensate for the positioning errors of radiating elements occurring when such an antenna is constructed. These positioning errors follow a law that is in theory random and whose result is known by determining the imperfection vector I whose components of real positioning errors measured for each feed of the antenna obtained comprising components forming values of an error function $\delta(n)$ where n represents the index attributed to the radiating element in question. The process according to the invention consists in first measuring the positioning errors. It then consists in determining the spatial spectral components making up error function $\delta(n)$. It finally consists in applying to each component an amplitude or phase modulation correction in order to compensate for the degradation of the error function $\delta(n)$ on the obtained antenna radiation pattern $F(\theta)$. The process according to the invention applies more particularly to antennas comprising radiating beams.

15 Claims, 6 Drawing Sheets

PROCESS COMPENSATING FOR ARRAY ANTENNA RADIATING ELEMENT POSITIONING ERRORS

RELATED APPLICATIONS

The present application is based on, and claims priority from, French Application Number 06 02381, filed Mar. 17, 2006, the disclosure of which is hereby incorporated by reference herein in its entirety.

SCOPE OF THE INVENTION

The invention refers to array antennas consisting of a set of individual sources set out over the surface of the antenna and whose mechanical positioning is determined in such a way as to obtain the desired radiation pattern.

CONTEXT OF THE INVENTION—PRIOR EMBODIMENT

When an antenna with distributed sources is built, for instance, an array antenna, one major problem that has to be solved comes from the relative mechanical positioning accuracy of the various sources. To detect accurately the presence of targets in the observation space, array antennas need to receive as little power as possible outside the major lobe. That is why the sources have to be positioned regularly and accurately on the antenna. Radiation pattern measurements $F(\theta)$, especially near field measurements, reveal that mechanical errors in array antennas, sources positioning errors, are errors that cause the definite degradation of the radiation patterns. But the current assembly techniques, and especially those allowing mass assembly, that is more or less automated, will not produce enough positioning accuracy to avoid the significant perturbation of the radiation pattern. This perturbation results in the appearance on either side of the major lobe of an undeniable quantity of diffuse lobes with sufficient gain to seriously alter the performances of the antenna, especially in terms of directivity.

PRESENTATION OF THE INVENTION

One purpose of the invention is to make it possible, in a practical way, to allow for these positioning errors so as to minimize the effects on the general performance of the antenna.

To do this, this invention refers to a compensating process for an array antenna positioning errors, characterized in that it includes at the least:

A step involving the measurement of the positioning error for each radiating element n and of compiling an imperfection vector I, whose components are values of the positioning error function $\delta(n)$, A step of modeling the error function $\delta(n)$ as the sum of the spectral sinusoidal components $E_n(i)$ calculated by the application of a Fourier transform to the imperfections vector I, followed by the application of an inverse Fourier transform to vector dd obtained in this way, A step involving the calculation of correction functions $\Delta_a(n)$, $\Delta_\phi(n)$, by amplitude and/or phase modulation, applicable to each of the spectral sinusoidal components $E_n(i)$ of function $\delta(n)$, with the correction functions defined as the sums of the spectral sinusoidal components $A_n(i)$ and $\Phi_n(i)$, a step involving the determination of the form of function $\Delta(n)$ to be applied to each of the spectral sinusoidal components $E_n(i)$ of function $\delta(n)$ depending on the aiming angle $\theta_0$ of the antenna.

According to the invention, function $\Delta(n)$ can be expressed as:

$$\Delta(n) = \sum_i \gamma(i) \cdot A_n(i) + (1 - \gamma(i)) \cdot \Phi_n(i) \gamma(i)$$

where $\gamma(i)$ represents a selection function equal to 1 or 0.

According to the invention once again, the value of $\gamma(i)$ is defined according to a threshold calculated from the aiming angle $\theta_0$.

According to an alternate implementation, the process according to the invention includes a supplementary weighting step regarding the spectral components of functions $\Delta_a(n)$ and $\Delta_\phi(n)$, whereby the overall correction function $\Delta(n)$ is then expressed as:

$$\Delta(n) = \sum_i f(i) \cdot \gamma(i) \cdot A_n(i) + f(i) \cdot (1 - \gamma(i)) \cdot \Phi_n(i) \gamma(i)$$

According to an alternate implementation, the weighting $f(i)$ follows an increasing linear law according to i.

According to another variant the weighting $f(i)$ follows an increasing logarithmic law according to i.

The purpose of the invention is also to form a radiation pattern $F(\theta)$ for an array antenna wherein it combines the correction process according to the invention with a step for determining the aiming phase law so as to construct the radiation pattern from the real positions of the radiating elements.

DESCRIPTION OF FIGURES

The operating principle of the invention and its advantages will be understood more clearly from reading the following description, which uses non-limitatively an example of the application and which refers to the attached figures presenting:

FIG. 1, a diagram representing an antenna used as an example for describing the process according to the invention, FIG. 2, a curve representative of the ideal theoretical radiation pattern of the antenna in FIG. 1, FIG. 3, a curve representative of the real radiation pattern of an antenna of the type shown in FIG. 1 presenting a sinusoidal positioning error of the radiating elements, FIG. 4, a curve representative of the real radiation pattern of an antenna of the type in FIG. 1 presenting the positioning error of FIG. 3, corrected by the phase modulation of the spectral components of the associated positioning error function, FIG. 5, a curve representative of the real radiation pattern of an antenna of the type in FIG. 1 presenting the positioning error of FIG. 3, corrected by the amplitude modulation of the spectral components of the associated positioning error function, FIGS. 6 and 7, the curve is representative of the real radiation patterns of antennas of the type shown in FIG. 1 presenting was in errors whatsoever, FIG. 8, a schematic flowchart of the principle of the correction process according to the invention, FIG. 9, showing the graphic representations of examples of the selection threshold evolution laws of the type of correction, depending on aiming $\theta_0$, FIG. 10, showing graphic representations of two weighting laws for the correction terms applied to the spectral components of the positioning error function.

DETAILED DESCRIPTION

Figure 1:
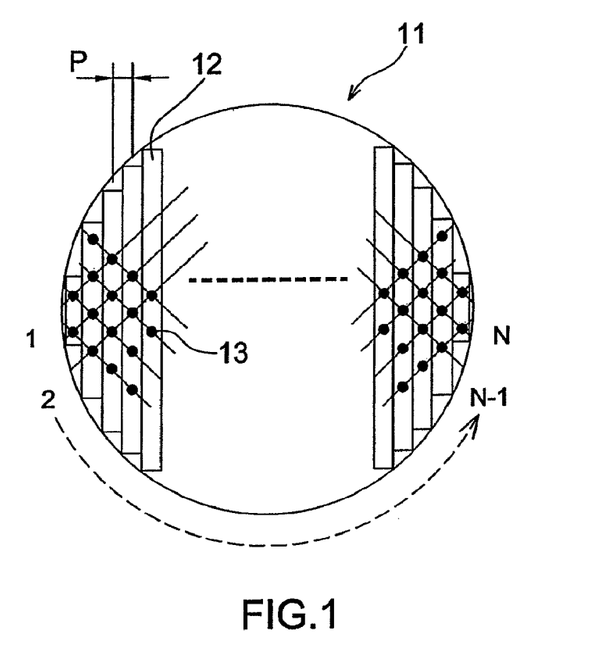

The example used for describing the process according to the invention in its principle is that of an antenna of the type shown in FIG. 1. This antenna 11 comprises a set of N radiating beams 12, each comprising a set of sources 13 aligned along the centerline of the beam.

The N beams forming the antenna are mechanically assembled in such a way that the axes of the beams are at a constant distance P from one another, or pitch, in such a way that when the beams are assembled, the antenna thus obtained is in the form of a set of sources set out alternatively and equidistantly from one another.

Figure 2:
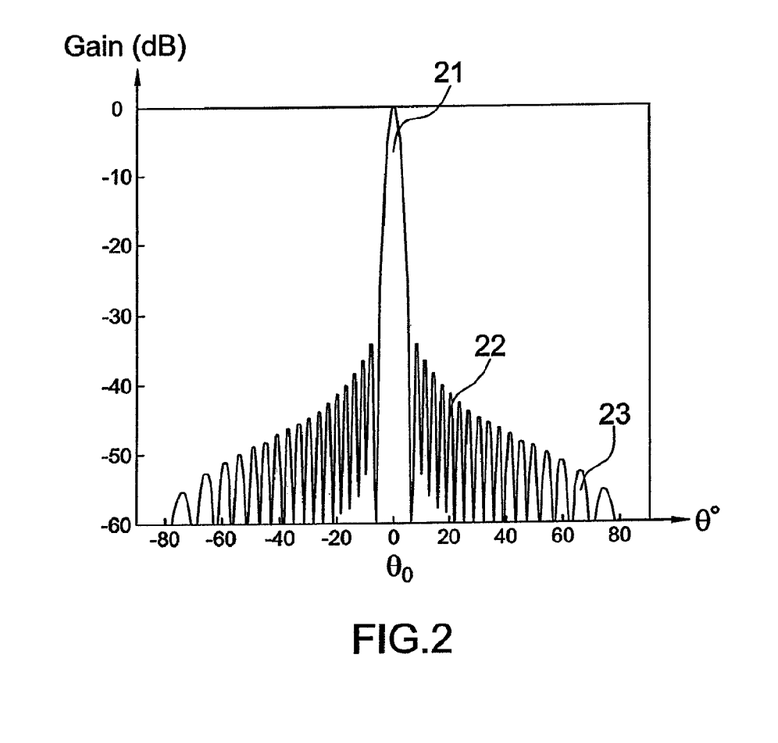

An arrangement of sources in this way permits, if the positioning of the sources with respect to one another is sufficiently accurate, the obtaining of a radiation pattern $F(\theta)$ similar to the one shown in 2. For a direction $\theta_0$ aimed at by the antenna, this radiation pattern has a major lobe 21 pointing in direction $\theta_0$ and centered about $\theta_0$, and side lobes 22, 23, pointing in directions other than direction $\theta_0$, whose level is significantly lower than that of the major lobe, by at least approximately 40 decibels.

Ideally, for an antenna comprising identical sources set out in a strictly constant manner, we obtain a radiation pattern $F_{ideal}$, for which the side lobe level decreases substantially and continuously, gradually as the direction $\theta$ in question moves away from direction $\theta_0$ in which the major lobe is pointing. Thus, for instance, for lobes 23 centered in a direction $\theta$ having an angle of more than 60° with respect to direction $\theta_0$, a lobe level with attenuation of more than 50 dB with respect to the level of major lobe 21.

In practice, it is difficult to construct an ideal antenna like this in a simple manner. Indeed, the precise positioning of the various sources presupposes that on each beam, on the one hand, the sources are arranged correctly and aligned and that, on the other, the beams are assembled with one another with strictly constant spacing (pitch) P. But if the alignment of the sources along a beam, resulting from the manufacturing of the radiating beams in question, is relatively easy to master, the assembly of the beams together with a more or less constant interval pitch is generally more difficult to obtain, in particular because of the positioning accuracy. Therefore, an assembled antenna generally incorporates source positioning defects resulting in the altering of the radiation pattern. This alteration essentially results primarily in the presence in pattern $F(\theta)$ of side lobes at a relatively high level. These side lobes which appear for certain specific values of $\theta$, have a substantially higher level than the side lobes appearing for the same values of $\theta$, in the pattern $F_{ideal}$. Accordingly, we obtain a radiation pattern $F_{perturbed}(\theta)$.

The presence of high level side lobe, has the unfortunate consequence of affecting the directivity of an antenna built in this way; this change in directivity can result, in particular, for a radar provided with such an antenna, in an increased false alarm rate.

The process according to the invention proposes a solution to correct this alteration by applying to the perturbed pattern $F_{perturbed}(\theta)$ a variable corrective term $\Delta F$. In this way it is advantageously possible according to the invention, to obtain a corrected illumination pattern $F_{corrected}(\theta)$ having as general expression:

$$F_{corrected}(\theta) = F_{perturbed}(\theta) + \Delta F(\theta) \quad [1]$$

According to the invention, the term $\Delta F(\theta)$ is determined to obtain, after application of the process, a corrected pattern $F_{corrected}(\theta)$ being as close as possible to ideal pattern $F_{ideal}(\theta)$.

In the case of an antenna such as the one shown in FIG. 1, considered as a non-limitative example, the ideal pattern $F_{ideal}(\theta)$ can be defined by the following relation:

$$F_{ideal}(\theta) = \sum_{n=1}^{N} a_n \cdot e^{-j \cdot k \cdot n \cdot P \cdot (\sin\theta - \sin\theta_0)} \quad [2]$$

in which $\theta_0$ represents the direction in which the antenna is pointing (direction of the major lobe of $F(\theta)$) and where P is the beam layout pitch. Factor k is the propagation constant of the wave in question. Note that here k is equal to $2\Pi/\lambda$, where $\lambda$ is the wavelength of the signal on which the antenna is matched.

The Ideal pattern $F_{ideal}$ is thus defined for each direction $\theta$ as the sum of the contributions of the elementary patterns relative to each of the radiating beams making up the antenna. Therefore, it appears as a sum of the complex terms of module $a_i$ and of argument $k.i.P.(\sin\theta - \sin\theta_0)$.

If we consider a real antenna for which the positioning of the radiating beams comprises imperfections, the corresponding perturbed pattern $F_{perturbed}(\theta)$ can be defined in a general manner by the following relation:

$$F_{perturbed}(\theta) = \sum_{n=1}^{N_x} a_n \cdot e^{-j \cdot k \cdot n \cdot P \cdot \sin\theta_0} e^{(j \cdot k \cdot (n \cdot P + \delta_n)\sin\theta)} \quad [3]$$

in which $\delta_n$ corresponds for the beam in row n to the position error value.

Subsequently, to obtain a corrected illumination pattern close to the ideal pattern: we can apply to the each term of the sum of the relation [3] a correction factor $\Delta(n)$. The continuation of the description describes how this correction factor is determined according to the invention.

Figure 3:
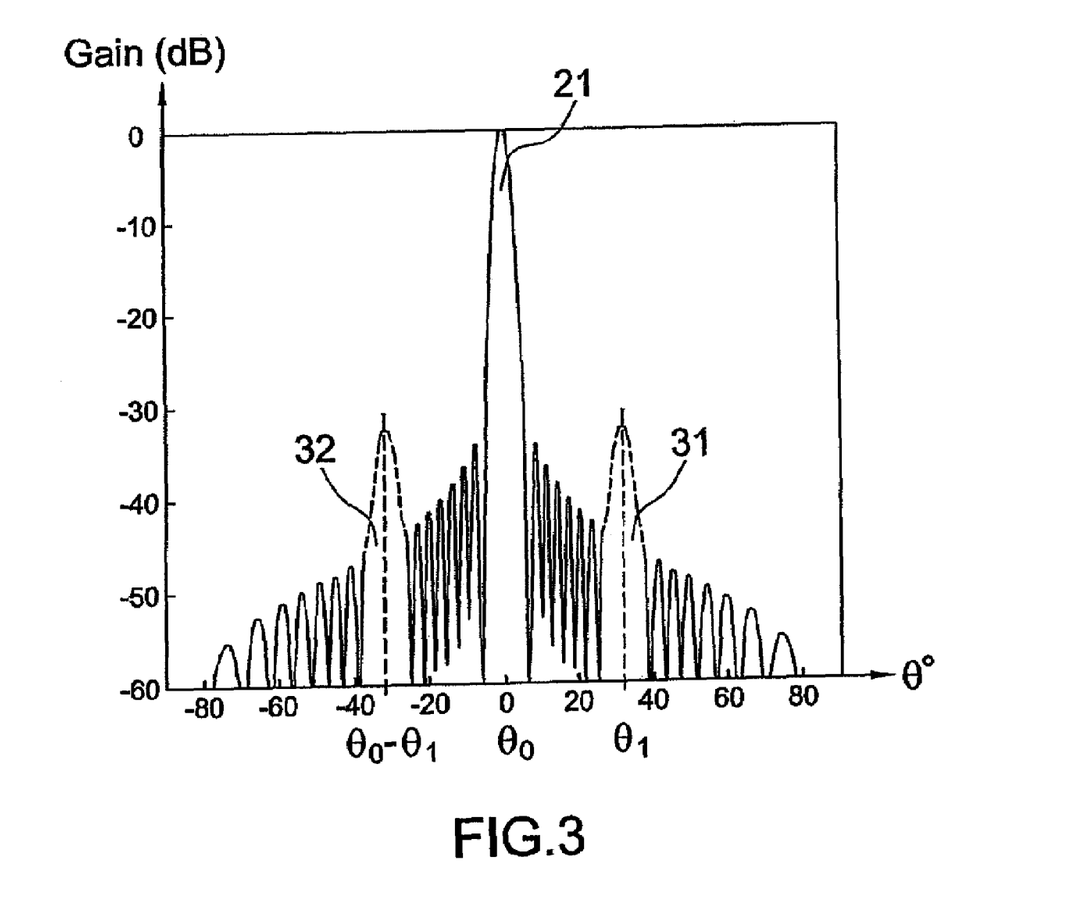
Figure 4:
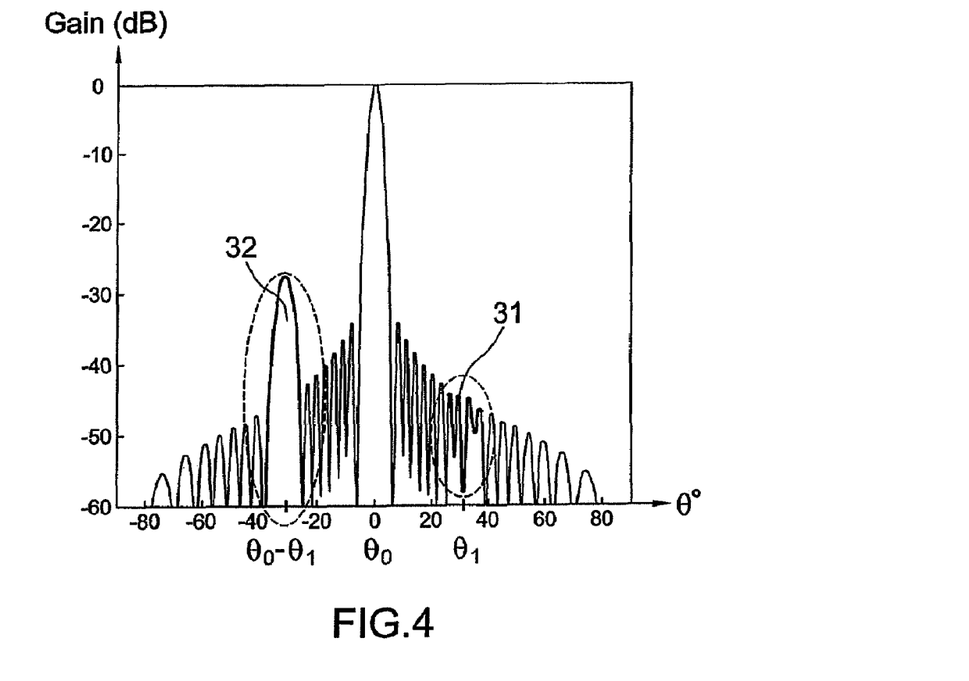
Figure 5:
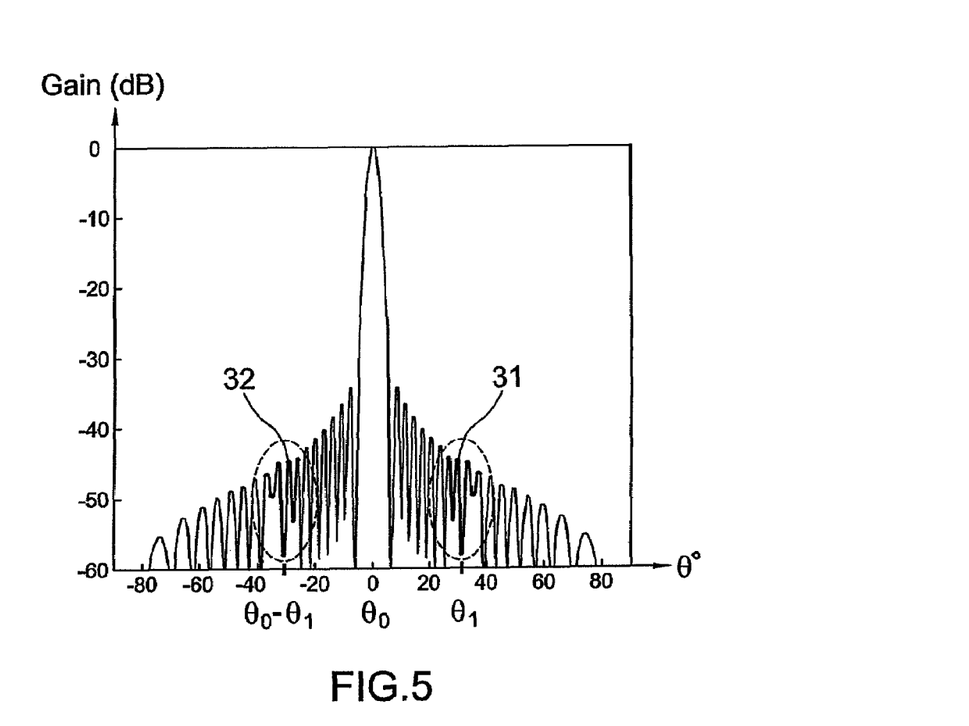

We will now refer to FIGS. 3 to 5.

FIG. 3 presents the radiation pattern obtained with an antenna whose beams have a specific positioning fault which value is a sinusoidal function of the position of the beam within the antenna. This type of fault, actually theoretical, is an advantageous manner of understanding the correction principle proposed by the invention.

For this particular fault, the positioning error of each of the beams can be defined by the following relation:

$$\forall n \in [1, Nx], \delta(n) = \delta_n = \delta P \cdot \sin(n\phi + \phi_0) \quad [4]$$

Errors $\delta(n)$ form the components of a vector which will be called the imperfections vector. This vector is loaded into the beam positioning errors with the corresponding indices.

Position error amplitude $\delta P$ here is considered as being low, approximately a few percent of the exact value of the pitch P, which is generally the case in reality.

Further, each error is also considered here as a correlated error for an entire beam while the positioning of the sources on the beam is assumed to be accurate enough not to make any significant contribution to the degradation of the illumination pattern. This makes it possible to investigate the perturbations caused by this defect, thinking not in terms of the real source array, in two dimensions, but of an equivalent linear source array.

As can be seen by comparing FIG. 3 with FIG. 1, a perturbation like this in the positions of the radiating element results in raising the level of the particular side lobes 31 and 32, centered in directions $\theta_0+\theta_1$ and $\theta_0-\theta_1$, symmetrical with each other, with respect to the major lobe centered on $\theta_0$.

The value of $\theta_1$ is, furthermore, linked with the term $\phi_1$ of the sinusoidal positioning fault $\delta(n)$ by the following relation:

$$u_1 = = k \cdot P \cdot (\sin(\theta_1) - \sin(\theta_0)) \qquad [5]$$

The positioning fault considered here also generates a local alteration, which does not modify in any way the appearance of the illumination pattern for the remainder of the field of observation. The alteration located at $\theta=\theta_1$ can be corrected advantageously by applying the appropriate selective correction.

The radiation pattern $F(\theta)$ can be represented according to relation [3], as the sum of complex terms and it is possible to apply a selective correction concerning only the module, the argument or the phase of each of the terms. Subsequently, the value of correction term $\Delta F(\theta)$ then verifies the following compensation condition relative to direction $\theta_1$:

$$F_{corrected}(\theta_1) = F_{perturbed}(\theta_1) + \Delta F(\theta_1) = F_{ideal}(\theta_1) \qquad [6]$$

We consider initially the case where the correction applied to the signals received or transmitted by each of the beams is a sinusoidal phase modulation $\Delta_\varphi(n)$ defined for a beam having any rank n (with n varying from 1 to N) by the following relation:

$$\Delta(n) = c \cdot \sin(n \cdot u_1 - \beta) = c \cdot \sin[n \cdot k \cdot P \cdot (\sin \theta_1 - \sin \theta_0) - \beta] \qquad [7]$$

in which $\theta_0$ is the direction in which the antenna is pointing.

The variable $u_1$ is itself defined by the following relation:

$$u_1 = k \cdot P \cdot (\sin \theta_1 - \sin \theta_0) \qquad [8]$$

The perturbed radiation pattern $F_{perturbed}(\theta)$ corresponding to the real antenna has the expression:

$$F_{perturbed}(\theta) = \sum_{n=1}^{N} a_n \cdot e^{-j \cdot k \cdot n \cdot P \cdot \sin \theta_0} e^{(j \cdot k \cdot (n \cdot P + \delta_n) \sin \theta)} \qquad [9]$$

where the expression of the perturbation $\delta_n$ is given by the relation [4].

In addition the corrected radiation pattern $F_{corrected}(\theta)$ corresponding to the real antenna, whose local side lobe aberrations need to be corrected, has the expression:

$$F_{corrected}(\theta) = \sum_{n=1}^{N} a_n \cdot e^{-j \cdot k \cdot n \cdot P \cdot \sin \theta_0} e^{(j \cdot k \cdot (n \cdot P + \delta_n) \sin \theta)} \cdot e^{j \Delta_\varphi(n)} \qquad [10]$$

where the expression of the perturbation $\Delta\phi(n)$ is given by the relation [7].

If it is considered on the one hand that correction $\Delta\phi(n)$ made has to be small compared to $F(\theta)$ and furthermore, as mentioned previously, that term $\delta_n$ is small compared to pitch P, it is possible to simplify the relation [9] (development limited to order 1 of $e^{j\Delta(n)}$) to obtain the following relations:

$$F_{corrected}(\theta) = \sum_{n=1}^{N} a_n \cdot e^{-j \cdot k \cdot n \cdot P \cdot \sin \theta_0} e^{(j \cdot k \cdot (n \cdot P + \delta_n) \sin \theta)} + \qquad [11]$$

$$j \cdot \sum_{n=1}^{N} a_n \cdot \Delta_\varphi(n) \cdot e^{-j \cdot k \cdot n \cdot P \cdot \sin \theta_0} e^{(j \cdot k \cdot (n \cdot P + \delta_n) \sin \theta)}$$

$$F_{corrected}(\theta) = \qquad [12]$$

$$F_{perturbed}(\theta) + j \cdot \sum_{n=1}^{N} a_n \cdot \Delta_\varphi(n) \cdot (1 + j \cdot k \cdot \delta_n \cdot \sin \theta) \cdot e^{j \cdot k \cdot n \cdot P (\sin \theta - \sin \theta_0)}$$

$$F_{corrected}(\theta) = F_{perturbed}(\theta) + \qquad [13]$$

$$j \cdot \sum_{n=1}^{N} a_n \cdot \Delta_\varphi(n) \cdot e^{j \cdot n \cdot u} + j \cdot \sum_{n=1}^{N} a_n \cdot \Delta_\varphi(n) \cdot j \cdot k \cdot \delta_n \cdot \sin \theta \cdot e^{j \cdot n \cdot u}$$

where u is defined by the relation [5]

In relation [12], the last term $$j \cdot \sum_{n=1}^{N} a_n \cdot \Delta(n) \cdot j \cdot k \cdot \delta_n \cdot \sin \theta \cdot e^{j \cdot n \cdot u}$$

appears as the product of two factors ($\delta_n$ and $\Delta_\varphi(n)$) of small amplitude, considered to be negligible compared to the two other terms. Subsequently the corrected array factor $F_{corrected}(\theta)$, or corrected radiation pattern, can be defined according to variable u by the following relation:

$$F_{corrected}(u) = F_{perturbed}(u) + j \cdot \sum_{n=1}^{N} a_n \cdot \Delta_\varphi(n) \cdot e^{j \cdot n \cdot u} \qquad [14]$$

or by replacing $\Delta_\varphi(n)$ by its literal expression, by the relations:

$$F_{corrected}(u) = F_{perturbed}(u) + j \cdot \sum_{n=1}^{N} a_n \cdot c \cdot \sin(n \cdot u_1 - \beta) \cdot e^{j \cdot n \cdot u} \qquad [15]$$

$$F_{corrected}(u) = \qquad [16]$$

$$F_{perturbed}(u) + j \cdot \sum_{n=1}^{N} a_n \cdot c \cdot \frac{e^{j(n \cdot u_1 - \beta)} - e^{-j(n \cdot u_1 - \beta)}}{2j} \cdot e^{j \cdot n \cdot u}$$

Subsequently, $\Delta F(u)$ is then defined by the following relation:

$$\Delta F(u) = \frac{c}{2} \cdot [e^{-j\beta} \cdot F_{ideal}(u + u_1) - e^{j\beta} \cdot F_{ideal}(u - u_1)] \qquad [17]$$

in the particular case where $u = u_1$:

$$\Delta F(u_1) = F_{corrected}(u_1) - F_{perturbed}(u_1) \qquad [18]$$

$$= \frac{c}{2} \cdot [e^{-j\beta} \cdot F_{ideal}(2u_1) - e^{j\beta} \cdot F_{ideal}(0)]$$

or yet again in considering the ideal $F_{ideal}(2u_1)$ as negligible:

$$\Delta F(u_1) = -\frac{c}{2} \cdot e^{j\beta} \cdot F_{ideal}(0) \qquad [19]$$

where $F_{ideal}(0)$ represents the value of $F(u)$ for u corresponding to the direction aimed at $\theta_0$ Subsequently, by using the condition on $u_1$ of relation [6] we obtain:

$$\Delta F(u_1) = F_{ideal}(u_1) - F_{perturbed}(u_1) = -\frac{c}{2} \cdot e^{j\beta} \cdot F_{ideal}(0)$$

and therefore:

$$c = 2 \cdot \left| \frac{F_{perturbed}(u_1) - F_{ideal}(u_1)}{F_{ideal}(0)} \right| \qquad [20]$$

$$\beta = \arg\left( \frac{F_{perturbed}(u_1) - F_{ideal}(u_1)}{F_{ideal}(0)} \right) \qquad [21]$$

Therefore, as shown in relations [20] and [21], it is possible to define a phase correction function for correcting the alterations of the pattern when they result from a sinusoidal positioning error of the beams making up the antenna in question, which positioning error, as illustrated in FIG. 3, results in the raising of two side lobes for directions $\theta_0+\theta_1$ and $\theta_0-\theta_1$. However, it should be noted that as can be seen in FIG. 4, when the applied correction is a phase modulation, the effect of this correction is to eliminate the unwanted side lobe 31 initially present in direction $\theta_0+\theta_1$, but at the same time strengthening the level of the side lobe 32 initially present in symmetrical direction $\theta_0-\theta_1$. This second undesirable effect results in considering a second type of correction, which consists in applying an amplitude correction.

We consider now the case where the correction applied to the signals received or transmitted by each of the beams is a sinusoidal amplitude modulation $\Delta_a(n)$ defined for a beam having any rank n (with n varying from 1 to N) by the following relation:

$$\Delta_a(n) = c' \cdot \sin(n.u_1 - \beta') = c' \cdot \sin[n \cdot k \cdot P \cdot (\sin\theta_1 - \sin\theta_0) - \beta'] \qquad [22]$$

By applying similar reasoning to that used in the case of a phase correction, it can be written that:

$$F_{corrected}(\theta) = \sum_{n=1}^{N} [a_n + \Delta_a(n)] \cdot e^{-j k \cdot n \cdot P \cdot \sin\theta_0} e^{(j k \cdot (n \cdot P + \delta_n) \sin\theta)} \qquad [23]$$

From then on, by reasoning similar to that applied previously, we establish the following relation:

$$\Delta F(u_1) = F_{ideal}(u_1) - F_{perturbed}(u_1) = -j \cdot \frac{c'}{2} \cdot e^{j\beta'} \cdot F_{ideal}(0) \qquad [24]$$

and we obtain:

$$c' = 2 \cdot \left| \frac{F_{perturbed}(u_1) - F_{ideal}(u_1)}{F_{ideal}(0)} \right| \qquad [25]$$

$$\beta' = \arg\left( j \frac{F_{perturbed}(u_1) - F_{ideal}(u_1)}{F_{ideal}(0)} \right) \qquad [26]$$

Accordingly, relations [25] and [26], can be used for defining an amplitude correction function capable of correcting the alterations of the pattern when they result from a sinusoidal beam positioning error. The correction made here also has the advantage, as illustrated in FIG. 5, of eliminating the rising of the spurious side lobe 31 initially observed and present in direction $\theta_0+\theta_1$, but also the rising of spurious lobe 32 initially observed in symmetrical direction $\theta_0-\theta_1$.

Thus, as can be seen in the previous paragraphs, in the case of an antenna made up of radiating beams and having a sinusoidal fault in its beam positioning, it is possible to determine a correction function correcting the effect of this positioning fault. The correction applied to the radiation pattern $F(\theta)$ of the antenna is a sinusoidal phase or amplitude correction. Simulations and tests carried out by the applicant also show that, as already mentioned, the amplitude modulation correction of pattern $F(\theta)$ appears in particular when difference $\theta_1-\theta_0$ is small, as giving the best results. Unlike correction by phase modulation, this correction by amplitude modulation is a way of eliminating both the spurious lobe appearing in direction $\theta_0+\theta_1$, as well as the spurious lobe image appearing in direction $\theta_0-\theta_1$. However, noted that the application of a correction which consists in modulating the phase of the illumination law should not be ruled out, because simulations made for increasing aim off angles $\theta_0$ reveal that once the image lobe has been defined for a theoretical direction so that difference $\theta_0-\theta_1$ is greater than 90°, it no longer needs to be taken into consideration whereas, at the same time, correction by phase modulation gives better results than correction by amplitude modulation. Therefore, and optimum correction consists in using one correction or the other as a function of the aim off and the angle for which a spurious side lobe appears.

Figure 6:
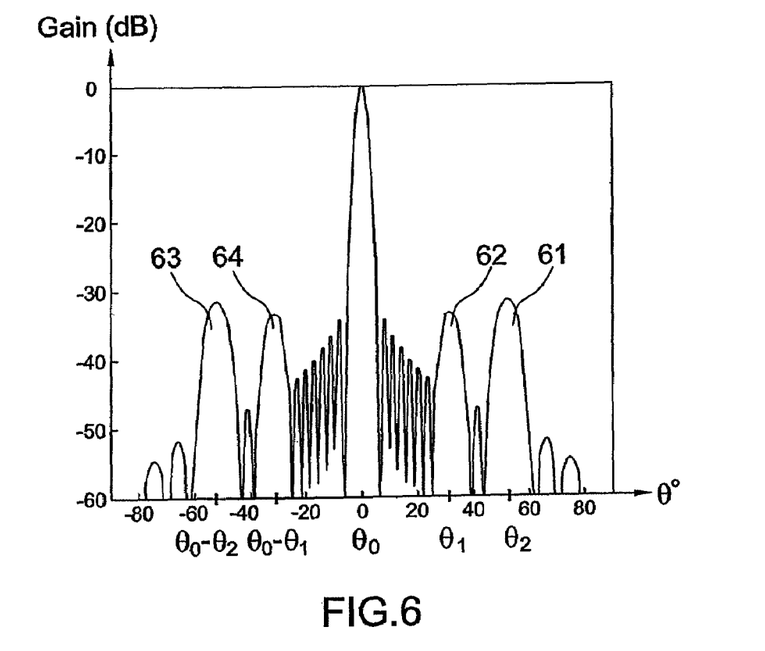
Figure 7:
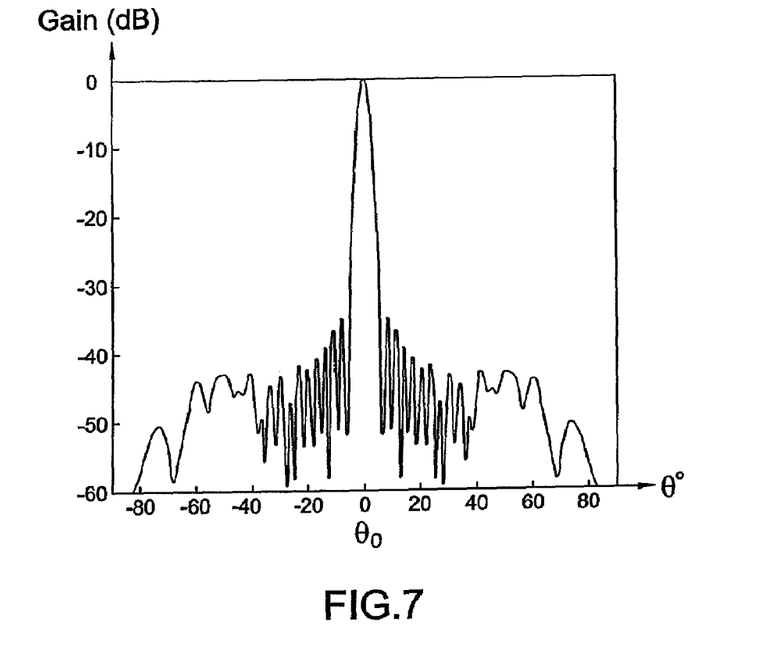

We then refer to FIGS. 6 and 7 which show the manner of generalizing the correction principle described in the previous paragraphs to the case of any positioning fault.

FIG. 6 illustrates the particular case in which the positioning fault of the beams can be described as a function that is the sum of two sinusoidal error functions As shown in the figure, this type of fault causes the rising of the two side lobes 61 and 62 for directions $\theta_0+\theta_1$ and $\theta_0+\theta_2$ in radiation pattern $F(\theta)$, and to symmetrical side lobes 63 and 64 for directions $\theta_0-\theta_1$ and $\theta_0-\theta_2$. The case illustrated by FIG. 6 is relatively simple to interpret and it is easy to understand that the previously described method of correction can be applied in a relatively direct manner to this particular case. The positioning error $\delta(n)$ of each of the beams can then be defined as a linear combination of two sinusoidal errors and can therefore be corrected by means of a function $\Delta_a(n)$ (or $\Delta_\phi(n)$) comprising a corrective term relative to the first error and a term relative to the second error.

FIG. 7 illustrates the general case in which the positioning fault cannot be described in a simple manner. In this case, we are confronted by the general de formation of the radiation pattern with a modification in the level of de side lobes and the diffused lobes. The level of some of the lobes then becomes lower than in the ideal case, whereas the level of some of the others becomes evidently higher. A pattern like this does not make it possible to determine simply the expression of the function characterizing the positioning error and accordingly, will not allow the direct generation of a correction to recover the ideal pattern $F_{ideal}(\theta)$ that characterizes the ideal antenna, obtained without any positioning error.

The process according to the invention proposes a solution for determining the correction, in particular in the general case in which the beam positioning error is a random error. The description goes on to present the various stages of the process summarized in FIG. 8.

Figure 8:
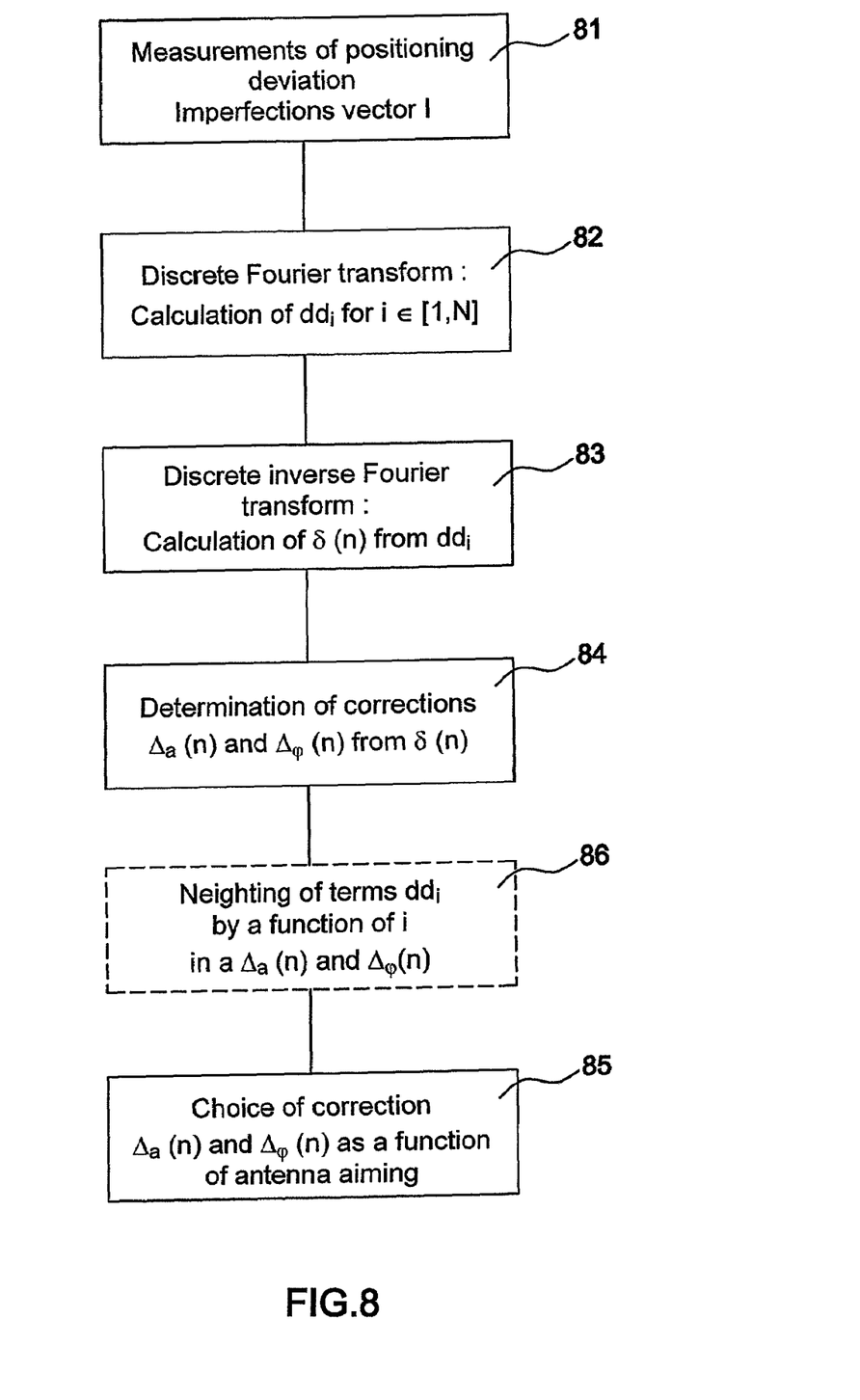

As illustrated in FIG. 8, the process according to the invention includes essentially 5 steps.

First step 81 is a measurement step which, after the assembly of the various radiating elements of the antenna, consists in determining for each of those elements, the deviation between the theoretical position of the element and its real position. In the case of an antenna comprising beams, considered as a non-limitative example in the description, this first step consists in measuring the positioning error of each beam with respect to its theoretical position.

These deviations form the components of a measured deviation vector I, or imperfection vector. In the example of an antenna made up of N radiating beams, vector I therefore includes N components.

As mentioned previously, in the general case corresponding to FIG. 7, the positioning error $\delta(n)$ cannot be described as a simple sinusoidal function of the beam of rank n. Subsequently, this error results not only in the raising of the level of a specific lobe in pattern $F(\theta)$, but in an alteration affecting the entire pattern.

The second step 82 and the third step 83 of the process according to the invention are designed to model the positioning error function $\delta(n)$, known by measurements made forming vector I, by a function defined as a sum of sinusoidal errors having periods P, 2P . . . (N−1)P.

The second step 82 goes on to the spectral breakdown of the error function. This breakdown is obtained, for instance, by the application of one of the discrete Fourier transforms to the sequence of samples comprising components of imperfection vector I. This conversion produces a new vector dd having the same length as the imperfections vector and which are symmetrical because of the real nature of the elements forming of the processed vector I. The $dd_i$ components of vector dd are defined by the following relation:

$$dd_i = \sum_{n=1}^{N} \delta(n) \cdot e^{\left(-j \cdot 2 \cdot \Pi \cdot \frac{(i-1) \cdot (n-1)}{N}\right)} \quad [27]$$

where i∈[1, N],

Terms $dd_i$ obtained in this way represent the complex spectral components of the error function in the spatial field. Each spectral component itself represents a sinusoidal error having period i, which error can be considered as responsible for the rising of a specific side lobe of pattern $F(\theta)$.

As far as the third step 83 is concerned, it consists in the inverse transformation to that performed during the previous step. Indeed, the inverse Fourier transform of vector dd restores access to imperfection vector I which is then written as a finite sum of sinusoids. Thus, it can be written that:

$$\delta(n) = \frac{1}{N_x} \sum_{i=1}^{N} |dd_i| \cdot \cos\left(2 \cdot \Pi \cdot \frac{(i-1) \cdot (n-1)}{N} + \arg(dd_i)\right) \quad [28]$$

where n∈[1,N]

Error $\delta(n)$ thus appears as a sum of sinusoidal perturbations that can be compensated for by means of a correction function appearing as a sum of modulations similar to the functions $\Delta_a(n)$ and $\Delta_{100}(n)$ described previously, in particular by means of relations [7] and [22]. This sum of modulations will compensate, one by one, for the spectral terms of the imperfection vector.

The fourth step 84 consists in determining the expression of the theoretical corrections of amplitude $\Delta_a(n)$ and phase $\Delta_{100}(n)$, used for correcting error $\delta(n)$ defined by relation [28].

In the case of an antenna like the one considered as an example, having a radiation pattern or a array factor, $F(\theta)$, perturbed by the positioning errors of the radiating beams with a zero aim-off, the correction to be applied to each sinusoidal error component, as seen previously, will be a correction by amplitude modulation rather than a correction by phase modulation. Subsequently, the corrected radiation pattern $F_{corrected}(\theta)$, can be defined by the following relation:

$$F(\theta) = \sum_{n=1}^{N} a_n \cdot (1 + 2\Pi \cdot \Delta_a(n)) \cdot e^{(j \cdot k \cdot (n \cdot P + \delta_n) \sin\theta)} \quad [29]$$

where $\Delta_a(n)$ represents the overall correction function. If we also consider that the positioning errors $\delta_n$ are small compared to distance P (pitch) separating Two array radiating elements, we can then apply a development limited to the term $e^{j k \delta_n \sin\theta}$. We then obtain the following relation:

$$F(\theta) = \sum_{n=1}^{N} a_n \cdot (1 + 2\Pi \cdot \Delta_a(n)) \cdot (1 + j \cdot k \cdot \delta_n \cdot \sin\theta) \cdot e^{(j \cdot k \cdot n \cdot P \sin\theta)} \quad [30]$$

Subsequently, by keeping only the first order terms: since the modulation term is also of small amplitude, and by identifying the expression obtained with that of the ideal pattern $F_{ideal}(\theta)$, we obtain the following relation:

$$\Delta_a(n) = -\frac{\sin\theta}{\lambda} \cdot j \cdot \delta_n \quad [31]$$

where n∈[1,N]

In this simple example, which can be generalized, we observe that $\Delta_a(n)$ is a function having the drawback of depending both on the positioning errors of the various antenna elements and on the observation direction $\theta$ being considered, which is not an intrinsic antenna parameter. Generally speaking, this double dependency makes it complex, if not to say impossible, to determine an efficient correction $\Delta_a(n)$ by means of relation [31].

To overcome this difficulty by using the principle of breaking down error function δ(n) into a sum of sinusoidal positioning errors, the process according to the invention proposes replacing the terms depending on angle θ by an increasing term. Accordingly, in the previous example: we replace relation [31] by the following relation:

$$\Delta_a(n) = -\frac{1}{\lambda} \cdot j \cdot \delta_n \quad [32]$$

Relation [32] corresponds to the substitution in relation [31] of the expression sin θ by the largest value it can assume in the observation space covered by pattern F(θ) (from −90° to +90°), i.e. value 1.

In this way, the expression of $\Delta_a(n)$ only depends on one parameter n, which represents the antenna element concerned. This advantageous maximization, which makes it possible to overcome the effects of parameter sin θ, has no major consequence on the correction made, since this correction is, in any case, of small amplitude.

Subsequently, according to the invention, the components of imperfection vector I will be replaced by those of the letter obtained by the inverse transform of the discrete Fourier transform of I, we can write the following relation:

$$\Delta_a(n) = \frac{-1}{\lambda} \cdot \frac{1}{N} \cdot \sum_{i=1}^{N} |dd_i| \cdot \sin\left(\frac{2 \cdot \Pi \cdot (n-1) \cdot (i-1)}{N} + \arg(dd_i)\right) \quad [33]$$

where n∈[1, N]

This relation is deduced from relation [28] in which de "cosine" terms become "sine" terms to allow for factor j of relation [32].

Thus, according to the invention, the determination of the correction function by amplitude modulation $\Delta_a(n)$ is carried out in a simple manner independent of observation direction θ, using vector components obtained by the application of an inverse Fourier transform dd.

This process of determination is made even easier by the symmetrical nature of the spectral breakdown of the positioning error, capable of bringing the expression of $\Delta_a(n)$ to a sum of N' terms, where N' is equal to the integer part of the number (N/2+1) (i.e. N'=floor(N/2+1). It then becomes possible to determine $\Delta_a(n)$ using the following relation:

$$\Delta_a(n) = \frac{-2}{\lambda \cdot N} \cdot \sum_{i=1}^{N'} |dd_i| \cdot \sin\left(\frac{2 \cdot \Pi \cdot (n-1) \cdot (i-1)}{N} + \arg(dd_i)\right) \quad [34]$$

where n∈[1, N]

Finally, for an arrangement in which the antenna is made up of radiating beams, the spacing P between the beams is more or less equal to half the operating wavelength (λ/2), while the expression of $\Delta_a(n)$ is given by the following relation:

$$\Delta_a(n) = \frac{-1}{P \cdot N} \cdot \sum_{i=1}^{N'} |dd_i| \cdot \sin\left(\frac{2 \cdot \Pi \cdot (n-1) \cdot (i-1)}{N_x} + \arg(dd_i)\right) \quad [35]$$

where n∈[1, N]

The latter approximate relation produces the expression of $\Delta_a(n)$ which is independent of the frequency. The operating frequency field of the antenna is generally equal to or greater than 10% of the central frequency value so that constant P, representing the distance (pitch) between two radiating elements, it is more or less equal to half the wavelength for the highest frequency in the field in question. In this way, it represents a good estimation of λ, to approximate in the expression of the modulation term depending on the frequency and thereby render the calculation of $\Delta_a(n)$ independent of the frequency.

The process according to the invention, in the same way enables the determining of an expression of the correction function by phase modulation that is independent both of the observation direction θ and of wavelength λ. The corrected pattern $F_{corrected}(\theta)$ then takes on the expression:

$$F(\theta) = \sum_{n=1}^{N} a_n \cdot e^{(j \cdot k \cdot (n \cdot P + \delta_n) \sin \theta)} \cdot e^{j \Delta \varphi(n)} \quad [36]$$

By the same process as before, using development limited to the exponential factor $e^{j \Delta (n)}$ containing the phase modulation (assumed to be small in amplitude), we find the expression of the phase modulation, which, being very similar to that of the amplitude modulation, is given in the following relation:

$$\Delta_\varphi(n) = \frac{1}{P \cdot N} \cdot \sum_{i=1}^{N'} |dd_i| \cdot \cos\left(\frac{2 \cdot \Pi \cdot (n-1) \cdot (i-1)}{N} + \arg(dd_i)\right) \quad [37]$$

where n∈[1, N]

The fifth step 85, consists in the automatic determination of the types of corrections to be applied to the various components of F(θ) depending on the antenna aim off. This is a necessary step for applying that of the corrections that is most appropriate. Indeed, as seen previously a correction by amplitude modulation gives the best results when there is only a small radiation pattern aim off angle. In this case, phase modulation correction, as illustrated in FIG. 4, raises the level of image side lobe 42. Conversely, when there is a considerable aim-off, the image lobe disappears from the field of view and correction by phase modulation of the spurious lobe offers greater performance. This makes it interesting to apply selectively to the spectral component in a given rank i this correction rather than any other. Then, the problem is to be solved of automatically determining, according to the aim off in question, what type of correction should be applied to a given component. The processing carried out at this stage of the process offers an advantageous solution to this problem.

The principle of processing carried out during this fifth step consists in bringing into the expression, correction functions $\Delta_a(n)$ and $\Delta_\varphi(n)$ with a binary function γ(i) taking the value 0 or 1, depending on the aim off. The corrections then have the expression:

$$\Delta'_a(n) = \frac{-1}{P \cdot N} \cdot \sum_{i=1}^{N'} \gamma(i) \cdot |dd_i| \cdot \sin\left(\frac{2 \cdot \Pi \cdot (n-1) \cdot (i-1)}{N} + \arg(dd_i)\right) \quad [38]$$

and

-continued $$\Delta(n) = \frac{1}{P \cdot N} \cdot \sum_{i=1}^{N'} (1 - \gamma(i)) \cdot |dd_i| \cdot \cos\left(\frac{2 \cdot \Pi \cdot (n-1) \cdot (i-1)}{N} + \arg(dd_i)\right) \quad [39]$$

According to the invention, the value of function γ(i) can be defined with respect to an integer reference threshold $k_0$, whose value varies decreasingly according to the aim off in question. γ(i) is also defined so that, gradually as the aim off increases for spectral components having a higher order i, which components cause side lobes to appear in directions $\theta_1$ remote from aim-off direction $\theta_0$, correction by phase modulation is preferable because the image spurious lobe is, in this case, no longer present in the field of view. Accordingly, by carefully choosing the threshold $k_0$, function γ(i) can be, for instance, defined in a simple way for any value of i included between 1 and N', by the following expression: "If i≦$k_0$ then γ(i)=1, otherwise γ(i)=0."

Figure 9:
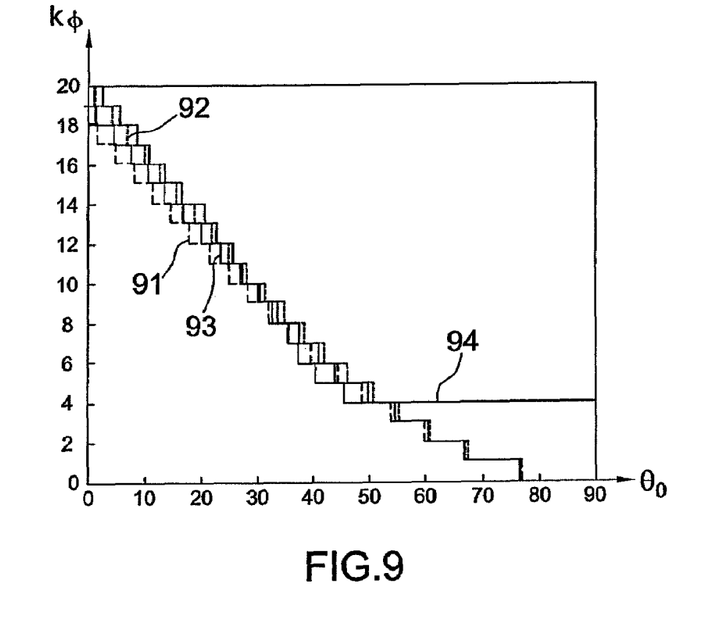

According to the invention, threshold $k_0$ varies theoretically between 0 and the number N' of modulation terms comprised in the correction function in question. In practice, we rule out the values close to the extremes by defining a low threshold, and possibly a high threshold. Indeed, an extreme value leads to a single type of correction, depriving this fifth step of any interest. As an example, FIG. 9 illustrates the evolution of threshold $k_0$ according to the aim off value $\theta_0$, in the specific case where $k_0$ is defined in an analytical manner by the following relation:

$$k_0 = \text{floor}\left(\frac{N \cdot P}{\lambda} \cdot (1 - |\sin\theta_0|) + 0.5\right) \quad [40]$$

where "floor" represents the integer part of the function.

In this relation, the value of $k_0$ depends on aim off angle $\theta_0$, and with the antenna size ratio (given by the term N·P) to the working wavelength λ.

In FIG. 9, the dotted line curves 91, 92 and 93 represent the evolution law of $k_0$, as calculated from relation [40], for three different values of λ, whereas the solid line curves 94 represents an evolution law constructed empirically from the previous curves and adjusted to allow for the simulation results which reveal, in particular, that the variation of λ in a reasonable range has no significant influence on the efficiency of the correction made. The definition of $k_0$ from the analytical formula [40] is not optimum in that it renders $k_0$ dependent on the frequency, resulting notably in the alteration of the solution at the terminals of the frequency interval in question; conversely, it gives a good idea of the general appearance to be assumed by the function and allows empirical refining on the basis of the simulation results, for instance.

With the type of correction to be applied to the various components of F(θ) determined in this way, the applied error correction function can be described, according to the invention, by the following relation:

$$\Delta(n) = \Delta_a'(n) + \Delta_\phi'(n) \quad [41]$$

On completion of these five steps cover the process according to the invention therefore allows us to apply a correction to the real radiation pattern corresponding to an antenna with radiating elements having positioning errors, which advantageously appears as the sum of several basic corrections, each designed to correct for the effects of a specific component in positioning error function δ(n).

The results of the simulations carried out by the filing entity also reveal that the overall correction determined in this way is efficient, in particular in a limited aim-off field $\theta_0$, typically covering 25° about the antenna axis corresponding to zero aim-off $\theta_0$. However, for relatively remote aim-off values, this correction causes a certain alteration of the level of the side lobes near from the major lobe, which, for instance, may result in the raising on the order of 3 dB of the first three side lobes of F(θ).

To improve the efficiency of the applied correction, if necessary the process according to the invention can be completed by an intermediate step 86, taking place between the fourth step 84 and the fifth step 85. This step consists in limiting the observed degradation of the first side lobes, in particular that for high aim-off values. This intermediate step 86 consists essentially in applying a spectral component weighting law f(i) to correction functions Δa(n) and Δϕ(n), determined after step 84, with the purpose of applying a slight correction to the components having low i indices and applying to the other components, a correction whose value increases with the index i. In this way, the side lobes corresponding to low spatial frequency errors will be little affected by the applied correction, whereas the more remote side lobes effectively will be corrected.

Figure 10:
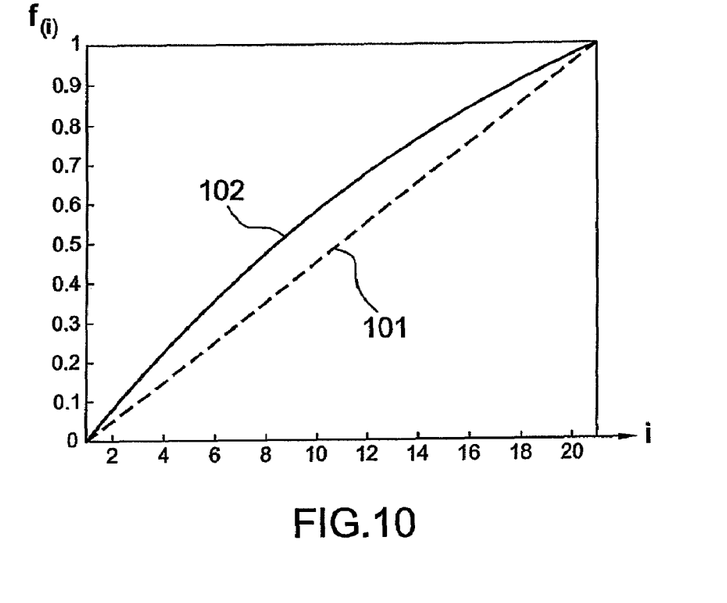

Various laws can be used to effect this correction. FIG. 10 gives a graphic representation of two laws $f_1(i)$ and $f_2(i)$ considered as non-limitative examples. Represented by curves 101 and 102 these laws are defined respectively for i ∈[1, N'], by the following relations:

$$f_1(i) = \frac{i-1}{N'} \quad [42]$$

and $$f_2(i) = \ln(1 + 1,72 \cdot (i-1)/N') \quad [43]$$

After this step, we obtain correction functions with the following expressions:

$$\Delta_a'(n) = \frac{-1}{P \cdot N} \cdot \sum_{i=1}^{N'} f(i) \cdot \gamma(i) \cdot |dd_i| \cdot \sin\left(\frac{2 \cdot \Pi \cdot (n-1) \cdot (i-1)}{N} + \arg(dd_i)\right) \quad [44]$$

and $$\Delta(n) = \frac{1}{P \cdot N} \cdot \sum_{i=1}^{N'} f(i) \cdot (1 - \gamma(i)) \cdot |dd_i| \cdot \cos\left(\frac{2 \cdot \Pi \cdot (n-1) \cdot (i-1)}{N} + \arg(dd_i)\right) \quad [45]$$

Step 85 for choosing the correction is then applied to these weighted functions.

The efficiency of the process according to the invention as described here, can also be increased even further by taking into consideration the positioning imperfections vector I, to establish the phase law to be applied to the various radiating element to form the desired pattern F(θ). Indeed, if the computer responsible for calculating the phase law to be applied to generate the aim off of the antenna in a direction $\theta_0$ is unaware of the positioning imperfections of the radiating elements, this phase law will be calculated with incorrect position values. Then, the correction function Δ(n) determined for the aim off $\theta_0$ will no longer be adapted to the correction of the real radiation pattern. This means that the applied correction will lose efficiency, in particular for aim-offs in a direction remote from the antenna centerline. Simulations by the filing entity demonstrate that by allowing for the positioning errors of the radiating elements in calculating the phase law applied to these elements, the aim off field for which the correction using the process according to the invention is efficient is increased substantially, typically by up to ±60° around $\theta_0$.

For the sake of keeping the description clear, the process according to the invention is presented through the particular example of an antenna comprising radiating beams and for which the positioning errors are reduced to simple one-dimensional errors in the spacing of the beams along an axis. This particular example, not limitative regarding the scope of the invention, is designed to outline a simple case in which the positioning errors form an imperfections vector I whose components are scalar magnitudes. Accordingly, the outline of the various steps of the process is not masked by the use of generally complex formulas not necessary for outlining the principle of the invention. Naturally, the process according to the invention applies to other antenna configurations, where there is a problem of the positioning of the radiating elements with respect to given theoretical positions.

The invention claimed is:

1. A process of compensating for the effects of the errors of location of the radiating elements of an array antenna on the radiation pattern of said antenna, said process comprising the following steps:

measuring the positioning error for each radiating element n and compiling an imperfection vector I, whose components are values of the positioning error function $\delta(n)$;

computing a spectral decomposition of the positioning error function $\delta(n)$, in the spatial domain, in the form of the sum of spectral sinusoidal components dd(i) calculated by application of a Fourier transform to the imperfections vector I, and applying an inverse Fourier transform to vector dd obtained in this way, each component of vector I being then expressed as a sum of sinusoidal errors;

calculating correcting functions $\Delta_a(n)$, $\Delta_\phi(n)$, from the sinusoidal spectral components dd(i) of the error function $\delta(n)$, said correcting functions being defined as sums of sinusoidal spectral components $A_n(i)$ and $\Phi_n(i)$;

elaborating a correction function $\Delta(n)$ from $\Delta_a(n)$ and $\Delta_{100}$(n) to apply to the radiation pattern $F(\theta)$ of the antenna, as a function of the aiming angle $\theta_0$ of the antenna, said correction $\Delta(n)$ being applied to the radiation patterns of the sources forming the radiation pattern $F(\theta)$ of the antenna, to correct the error of location of the considered source.

2. The process according to claim 1, wherein $\Delta_a(n)$ is defined by the following relation:

$$\Delta_a(n) = \frac{-2}{\lambda \cdot N} \cdot \sum_{i=1}^{N'} |dd_i| \cdot \sin\left(\frac{2 \cdot \Pi \cdot (n-1) \cdot (i-1)}{N} + \arg(dd_i)\right)$$

Where $n \in [1, N]$, N' being equal to the integer part of the number (N/2+1).

3. Process according to claim 1, wherein $\Delta_\phi(n)$ is defined by the following relation:

$$\Delta_\varphi(n) = \frac{1}{P \cdot N} \cdot \sum_{i=1}^{N'} |dd_i| \cdot \cos\left(\frac{2 \cdot \Pi \cdot (n-1) \cdot (i-1)}{N} + \arg(dd_i)\right)$$

Where $n \in [1, N]$, N' being equal to the integer part of the number (N/2+1).

4. The process according to claim 1, wherein the perturbed radiation pattern being expressed as:

$$F_{perturbed}(\theta) = \sum_{n=1}^{N} a_n \cdot e^{-j \cdot k \cdot n \cdot P \cdot \sin\theta_0} e^{(j \cdot k \cdot (n \cdot P + \delta_n)\sin\theta)}$$

the corrected radiation pattern is expressed as:

$$F_{corrected}(\theta) = \sum_{n=1}^{N} [a_n + \Delta_a(n)] \cdot e^{-j \cdot k \cdot n \cdot P \cdot \sin\theta_0} e^{(j \cdot k \cdot (n \cdot P + \delta_n)\sin\theta)}.$$

5. The process according to claim 2, wherein the perturbed radiation pattern being expressed as:

$$F_{perturbed}(\theta) = \sum_{n=1}^{N} a_n \cdot e^{-j \cdot k \cdot n \cdot P \cdot \sin\theta_0} e^{(j \cdot k \cdot (n \cdot P + \delta_n)\sin\theta)}$$

the corrected radiation pattern is expressed as:

$$F_{corrected}(\theta) = \sum_{n=1}^{N} [a_n + \Delta_a(n)] \cdot e^{-j \cdot k \cdot n \cdot P \cdot \sin\theta_0} e^{(j \cdot k \cdot (n \cdot P + \delta_n)\sin\theta)}.$$

6. The process according to claim 1, wherein the perturbed radiation pattern being expressed as:

$$F_{perturbed}(\theta) = \sum_{n=1}^{N} a_n \cdot e^{-j \cdot k \cdot n \cdot P \cdot \sin\theta_0} e^{(j \cdot k \cdot (n \cdot P + \delta_n)\sin\theta)}$$

the diagram of corrected brilliance(radiation) has for expression:

$$F_{corrected}(\theta) = \sum_{n=1}^{N} a_n \cdot e^{-j \cdot k \cdot n \cdot P \cdot \sin\theta_0} e^{(j \cdot k \cdot (n \cdot P + \delta_n)\sin\theta)} \cdot e^{j\Delta_\varphi(n)}.$$

7. The process according to claim 3, wherein the perturbed radiation pattern being expressed as:

$$F_{perturbed}(\theta) = \sum_{n=1}^{N} a_n \cdot e^{-j \cdot k \cdot n \cdot P \cdot \sin\theta_0} e^{(j \cdot k \cdot (n \cdot P + \delta_n)\sin\theta)}$$

the diagram of corrected brilliance(radiation) has for expression:

$$F_{corrected}(\theta) = \sum_{n=1}^{N} a_n \cdot e^{-j \cdot k \cdot n \cdot P \cdot \sin\theta_0} e^{(j \cdot k \cdot (n \cdot P + \delta_n) \sin\theta)} \cdot e^{j \Delta_\varphi(n)}.$$

8. The process according to claim 1, wherein the correction $\Delta(n)$ is expressed as:

$$\Delta(n) = \sum_i \gamma(i) \cdot A_n(i) + (1 - \gamma(i)) \cdot \Phi_n(i)$$

the terms $A_n(i)$ and $\Phi_n(i)$ representing respectively the components of $\Delta_a(n)$ and $\Delta_\phi(n)$ and y(l) representing a function equal to 1 or 0.

9. The process according to claim 6, wherein y(l) is defined as a function of a threshold calculated from the aiming angle $\theta_0$.

10. The process according to claim 1, further comprising a complementary spectral components weighting step for functions $\Delta_a(n)$ and $\Delta_\phi(n)$ while the overall correction function $\Delta(n)$ is then expressed as:

$$\Delta(n) = \sum_i f(i) \cdot \gamma(i) \cdot A_n(i) + f(i) \cdot (1 - \gamma(i)) \cdot \Phi_n(i)$$

the terms $A_n(i)$ and $\phi_n(i)$ representing respectively the components of $\Delta_a(n)$ and $\Delta_\phi(n)$ and y(l) representing a function equal to 1 or 0; f(i) being a weighting factor.

11. The process according to claim 8, further comprising a complementary spectral components weighting step for functions $\Delta_a(n)$ and $\Delta_\phi(n)$ while the overall correction function $\Delta(n)$ is then expressed as:

$$\Delta(n) = \sum_i f(i) \cdot \gamma(i) \cdot A_n(i) + f(i) \cdot (1 - \gamma(i)) \cdot \Phi_n(i);$$

f(i) being a weighting factor.

12. The process according to claim 10, wherein weighting f(i) follows an increasing linear law according to i.

13. The process according to claim 11, wherein weighting f(i) follows an increasing linear law according to i.

14. The process according to claim 10, wherein weighting f(i) follows an increasing logarithmic law according to i.

15. The process according to claim 11, wherein weighting f(i) follows an increasing logarithmic law according to i.

\* \* \* \* \*